(12) United States Patent
Marvaniya et al.

(10) Patent No.: US 11,393,194 B2
(45) Date of Patent: Jul. 19, 2022

(54) SELECTIVE ANALYSIS FOR FIELD BOUNDARY DETECTION

(71) Applicant: INTERNATIONAL BUSINESS MACHINES CORPORATION, Armonk, NY (US)

(72) Inventors: Smitkumar Narotambhai Marvaniya, Bangalore (IN); Zishan Sami, Muzaffarpur (IN); Umamaheswari Devi, Marathahalli (IN); Manikandan Padmanaban, Karnataka (IN); Otis Smart, Duluth, GA (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 16/990,275

(22) Filed: Aug. 11, 2020

(65) Prior Publication Data
US 2022/0051016 A1    Feb. 17, 2022

(51) Int. Cl.
| | | |
|---|---|---|
| G06V 20/10 | (2022.01) | |
| G01S 13/90 | (2006.01) | |
| G06V 10/22 | (2022.01) | |
| G06V 10/25 | (2022.01) | |
| G06V 10/44 | (2022.01) | |

(52) U.S. Cl.
CPC ........ G06V 20/188 (2022.01); G01S 13/9027 (2019.05); G06V 10/22 (2022.01); G06V 10/25 (2022.01); G06V 10/44 (2022.01)

(58) Field of Classification Search
None
See application file for complete search history.

(56) References Cited

U.S. PATENT DOCUMENTS

| | | |
|---|---|---|
| 5,978,723 A | 11/1999 | Hale |
| 6,505,146 B1 | 1/2003 | Blackmer |

(Continued)

FOREIGN PATENT DOCUMENTS

| | | |
|---|---|---|
| CN | 108305244 A | 7/2018 |
| CN | 110264474 A | 9/2019 |
| CN | 110751308 A | 2/2020 |

OTHER PUBLICATIONS

Garcia-Pedrero, et al., A Machine Learning Approach for Agricultural Parcel Delineation through Agglomerative Segmentation, International Journal of Remote Sensing, vol. 38, No. 7, http://dx.doi.org/10.1080/01431161.2016.1278312, Dec. 23, 2016, pp. 1809-1819.

(Continued)

*Primary Examiner* — Santiago Garcia
(74) *Attorney, Agent, or Firm* — Tihon Poltavets

(57) ABSTRACT

A method for selective boundary detection includes identifying a plurality of boundaries for a plurality of subregions in a region of interest utilizing one or more multispectral images for the region of interest. The method further includes analyzing a plurality of adjacent fields to a first field in a first subregion out of the plurality of subregions utilizing a region identification criterion based on a plurality of attributes for the first field and the plurality of adjacent fields. The method further includes determining, based on the analyzing, the first region with the first field requires further analysis of multitemporal remote sensed data over a defined period of time.

20 Claims, 8 Drawing Sheets

(56) References Cited

U.S. PATENT DOCUMENTS

| | | | |
|---|---|---|---|
| 7,003,161 B2 | 2/2006 | Tessadro | |
| 8,731,836 B2 | 5/2014 | Lindores | |
| 10,015,360 B1 | 7/2018 | Kurzhanskiy | |
| 10,318,847 B1 | 6/2019 | Keisler et al. | |
| 10,331,980 B1* | 6/2019 | Chartrand | G06V 10/768 |
| 2012/0293669 A1* | 11/2012 | Mann | G01J 3/36 |
| | | | 348/207.11 |
| 2014/0107957 A1* | 4/2014 | Lindores | A01B 79/005 |
| | | | 702/85 |
| 2015/0254800 A1* | 9/2015 | Johnson | G06V 20/188 |
| | | | 382/141 |
| 2018/0373932 A1* | 12/2018 | Albrecht | G06V 10/82 |
| 2019/0228224 A1* | 7/2019 | Guo | G06V 20/13 |
| 2019/0370966 A1 | 12/2019 | Albrecht | |
| 2020/0125929 A1* | 4/2020 | Guo | G06T 7/00 |
| 2021/0133966 A1* | 5/2021 | Fuchs | G06T 19/00 |
| 2021/0150207 A1* | 5/2021 | Guo | G06N 3/08 |
| 2021/0150209 A1* | 5/2021 | Guo | G06N 3/08 |
| 2021/0158041 A1* | 5/2021 | Chowdhary | G05D 1/027 |
| 2022/0012874 A1* | 1/2022 | Maier-Hein | G06T 7/254 |

OTHER PUBLICATIONS https://map.onesoil.ai/2018#3.4/39.32/-95.79, "First Interactive Map with AI Detected Fields and Crops", Agricultural OneSoil Map with AI detected fields and crops, printed Apr. 27, 2020, pp. 1-2.

North, et al., "Boundary Delineation of Agricultural Fields in Multitemporal Satellite Imagery", IEEE Journal of Selected Topics in Applied Earth Observations and Remote Sensing, vol. 12, No. 1, https://ieeexplore.ieee.org/stamp/stamp.jsp?tp=&arnumber=8584043, Jan. 2019, pp. 237-251.

Yan et al., "Automated crop field extraction from multi-temporal Web Enabled Landsat Data", Remote Sensing of Environment 144 (2014), pp. 1-24.

* cited by examiner

SELECTIVE ANALYSIS FOR FIELD BOUNDARY DETECTION

FIELD OF INVENTION

This disclosure relates generally to field boundary detection, and in particular to selective analysis of multitemporal remote sensed data to detect field boundaries.

BACKGROUND OF THE INVENTION

Presently, field boundary detection utilizes standard image-processing tools applied to multispectral RGB images that often yields missing or false edges for defining boundaries, which leads to agglomerated or fragmented fields, respectively. Disambiguation of the missing or false edges is required to provide accurate field boundaries, especially in areas where agricultural fields are smaller and less defined due to thin edge of separation. Crop input providers, insurance companies, and commodity traders are a few industry examples that utilize field boundary data for providing products and services.

SUMMARY

Embodiments in accordance with the present invention disclose a method, computer program product and computer system for selective boundary detection, the method, computer program product and computer system can identify a plurality of boundaries for a plurality of subregions in a region of interest utilizing one or more multispectral images for the region of interest. The method, computer program product and computer system can analyze a plurality of adjacent fields to a first field in a first subregion out of the plurality of subregions utilizing a region identification criterion based on a plurality of attributes for the first field and the plurality of adjacent fields. The method, computer program product and computer system can determine, based on the analyzing, the first region with the first field requires further analysis of multitemporal remote sensed data over a defined period of time.

DETAILED DESCRIPTION

Embodiments of the present invention provide a method to resolve boundaries in agglomerated and fragmented fields through selective analysis of remote sensed data over a defined period of time. Analyzing multitemporal remote sensed data is computational heavy since acquiring, processing, and analyzing remote sensed data over times requires a vast quantity of power and storage that is not scalable for large spatial regions (e.g., country). However, selective analysis of a portion of subregions in a region of interest provide a balance between efficiency (i.e., reduced computation) and accuracy. Embodiments of the present invention provide a first level analysis of multispectral images for the region of interest to identify subregions and an identification of a portion of subregions that require a second level analysis of the multitemporal remote sensed data. Identifying the portion of subregions that require the second level analysis of the multitemporal remote sensed data is based on two constraints. The first constraint is shapes and sizes of a plurality of fields in a subregion and the second constraint is shapes and sizes of neighboring fields. A classifier is trained to identify regions for the second level analysis utilizing attributes that include a contour perimeter, a contour area, a convex hull area, a ratio between the convex hull area and the contour area, and a ratio between the contour area and the contour perimeter.

Subsequent to identifying the portion of subregions for the second level analysis, embodiments of the present invention analyze multitemporal images utilizing a long short-term memory (LSTM) and fully convolutional network (FCN) based deep neural network that generates a single output image with segmentation for the region of interest that includes the portion of subregions. Synthetic-aperture radar (SAR) images, normalized difference vegetation index (NDVI) images, and weather parameters (e.g., temperature, humidity, precipitation amount, drought levels) are utilized for the multitemporal image analysis, where the deep neural network first analyzes the multitemporal images to learn a d-dimension vector for a given pixel location. The step first analyzes the temporal behavior for a given pixel for each remote sensed image type (i.e., SAR vs NDVI) in combination with weather data, where multiple remote sensed images are them represented as d-dimensional image. Certain weather conditions (e.g., high precipitation levels) can affect SAR coefficients and an attention layer in the LSTM applies weights to the data to take into account the effects of the weather conditions. To capture the spatial characteristics of the image, the d-dimensional image is further processed utilizing a fully convolution network (FCN) to estimate the instance segmentation of the field region.

Figure 1:
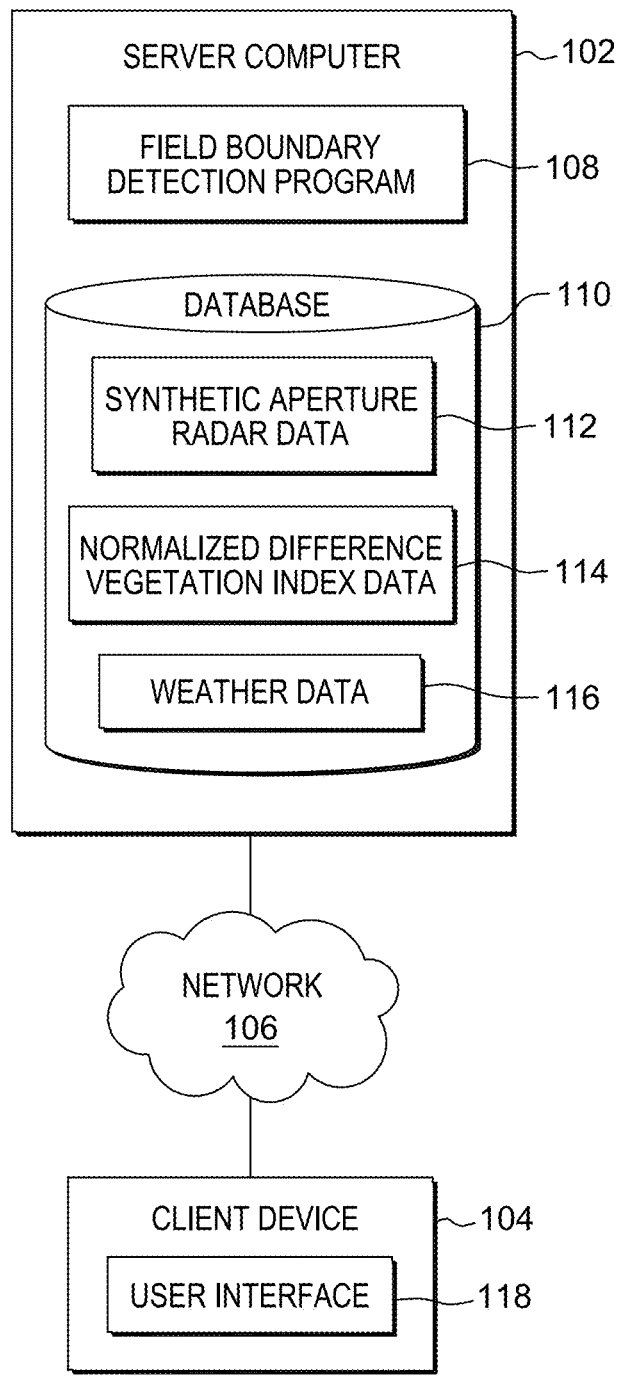
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102 and client device 104 all interconnected over network 106.

Server computer 102 may be a desktop computer, a laptop computer, a tablet computer, a specialized computer server, a smartphone, or any computer system capable of executing the various embodiments of field boundary detection program 108. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine-readable program instructions and communicating with other computer devices via a network. Server computer 102 has the ability to communicate with other computer devices (not illustrated in FIG. 1) to query the computer devices for information. In this embodiment, server computer 102 includes field boundary detection program 108 capable of communicating with database 110, where database 110 includes synthetic aperture radar (SAR) data 112, normalized difference vegetation index (NDVI) data 114, and weather data 116.

Client device 104 may be a cellphone, smartphone, smartwatch, laptop, tablet computer, or any other electronic device capable of communicating via network 106. In general, client device 104 represents one or more programmable electronic devices or combination of programmable electronic devices capable of executing machine readable program instructions and communicating with other computing devices (not shown) within distributed data processing environment via a network, such as network 106. In one embodiment, client computing device 104 represents one or more devices associated with a user. Client device 104 includes user interface 118, where user interface 118 enable a user of client device 104 to interact with field boundary detection program 108 on server computer 102. User interface 118 enables a user to identify a region of interest for field boundary detection and view an output image with generated field objects for the region of interest, including the portion of subregions which required selective analysis of the multitemporal remote sensed data.

Field boundary detection program 108 can identify a portion of subregions in a region of interest for performing analysis on multitemporal remote sensed data and analyzing the multitemporal remote sensed data for the portion of subregions to generate field objects for the region of interest. Field boundary detection program 108 can identify a region of interest and identify boundaries for subregion in the region of interest utilizing traditional image processing techniques (i.e., multi-spectral image analysis). Field boundary detection program 108 analyzes the multi-spectral image data for the subregions in the region of interest and identifies a portion of subregions in the region of interest for analyzing multitemporal remote sensed data. Field boundary detection program 108 can analyze the multitemporal remote sense data for the portion of subregions utilizing a long short-term memory (LSTM) and fully convolutional network (FCN) based deep neural network to generate field objects for the portion of subregions. Field boundary detection program 108 displays an output image with the generated field object for the region of interest, that includes the portion of subregions.

Database 110 is a repository for data utilized by field boundary detection program 108 such as, SAR data 112, NDVI data 114, and weather data 116. In the depicted embodiment, database 110 resides on server computer 102. In another embodiment, database 110 may reside on client device 104 or elsewhere within distributed data processing environment provided field boundary detection program 108 has access to database 110. Database 110 can be implemented with any type of storage device capable of storing data and configuration files that can be accessed and utilized by field boundary detection program 108, such as a database server, a hard disk drive, or a flash memory. SAR data 112 represents two-dimensional or three-dimensional reconstruction images for a plurality of regions captured by a synthetic-aperture radar at different points in time (e.g., daily, weekly, monthly, seasonally), where the plurality of regions includes the region of interest that field boundary detection program 108 identifies. NDVI data 114 represents graphical images of vegetation for a plurality of regions that includes the region of interest at different points in time (e.g., daily, weekly, monthly, seasonally). Weather data 116 represents weather information for a plurality of regions that includes the region of interest at different points in times time (e.g., daily, weekly, monthly, seasonally) and can include temperature (i.e., daily high and low temperatures), humidity, amount of precipitation, palmer drought severity index (PDSI), and any other weather information that can affect SAR data 112 and NDVI data 114.

In general, network 106 can be any combination of connections and protocols that will support communications between server computer 102 and client device 104. Network 106 can include, for example, a local area network (LAN), a wide area network (WAN), such as the Internet, a cellular network, or any combination of the preceding, and can further include wired, wireless, and/or fiber optic connections. In one embodiment, field boundary detection program 108 can be a web service accessible via network 106 to a user of client device 104. In another embodiment, field boundary detection program 108 may be operated directly by a user of server computer 102.

Figure 2:
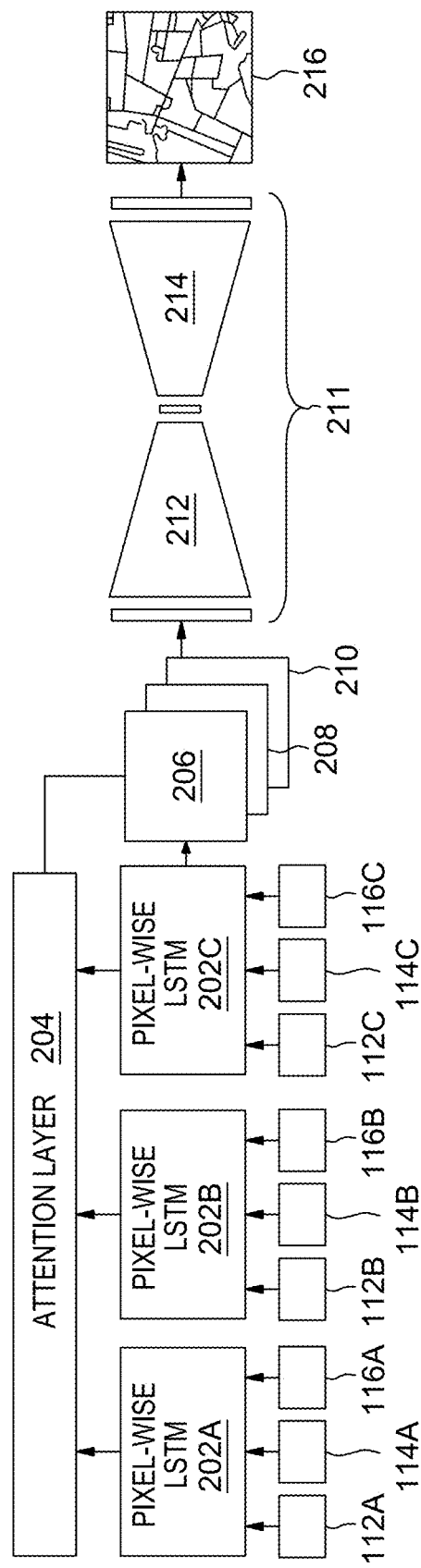
FIG. 2 is a process flow for a field boundary detection program analyzing the multitemporal remote sensed data, in accordance with an embodiment of the present invention.

FIG. 2 is a process flow for a field boundary detection program analyzing the multitemporal remote sensed data, in accordance with an embodiment of the present invention.

Snapshots of SAR data 112, NDVI data 114, and weather data 116 are utilized for a region of interest to produce spatiotemporal output 206 based on pixel-wise spaciotemporal pattern utilizing pixel-wise 3D long short-term memory (LSTM) 202 analysis for each of the snapshots. SAR data 112A, 112B, and 112C represents snapshots of synthetic-aperture radar data for the region of interest at three different points in time (e.g., January 2020, February 2020, and March 2020). NDVI data 114A, 114B, and 114C represents snapshots of normalized difference vegetation index data for the region of interest for the same three different points in time as SAR data 112A, 112B, and 112C, respectively. Similarly, weather data 116A, 116B, and 116C represents snapshots of weather information for the region of interest for the same three different points in time as SAR data 112A, 112B, and 112C, respectively.

Temporal image analysis is performed on SAR data 112 and NDVI data 114 via pixel-wise 3D LSTM at the different points in times, where the LSTMs are updated with each analysis performed at a different point in time. Each LSTM cell shares a similar weight during the analysis, where any weighting is assigned at attention layer 204. LSTM 202A produces spatiotemporal output 206 for the first point in time, pixel-wise LSTM 202B produces spatiotemporal output 206 for the second point in time, and pixel-wise LSTM 202C produces spatiotemporal output 206 for the third point in time. The multiple classes of remote-sensed data for the three different points in time are combined and attention layer 204 identifies a weight to be assigned to each of the multiple classes. In one example, the weight assigned is based on a time of year, since visible vegetation growth varies month to month and season to season. For example, during an initial phase of soil preparation (i.e., early growth stage), higher weights are assigned to SAR data compared to NDVI data. However, the weight of NDVI data increases and the weight of SAR data decreases as the growth stage progresses and the vegetation approaches harvesting conditions. The relative weights can further be defined by a particular crop type and known growth stages for the particular crop type. Spatiotemporal output 206 combined with multispectral snapshots 208 and 210 (e.g., red-green-blue (RGB) and NDVI images) are fed to the spatial feature extractor processed via full convolutional network (FCN) 211 with encoder 212 and decoder 214, to produce final segmented output 216.

Figure 3A:
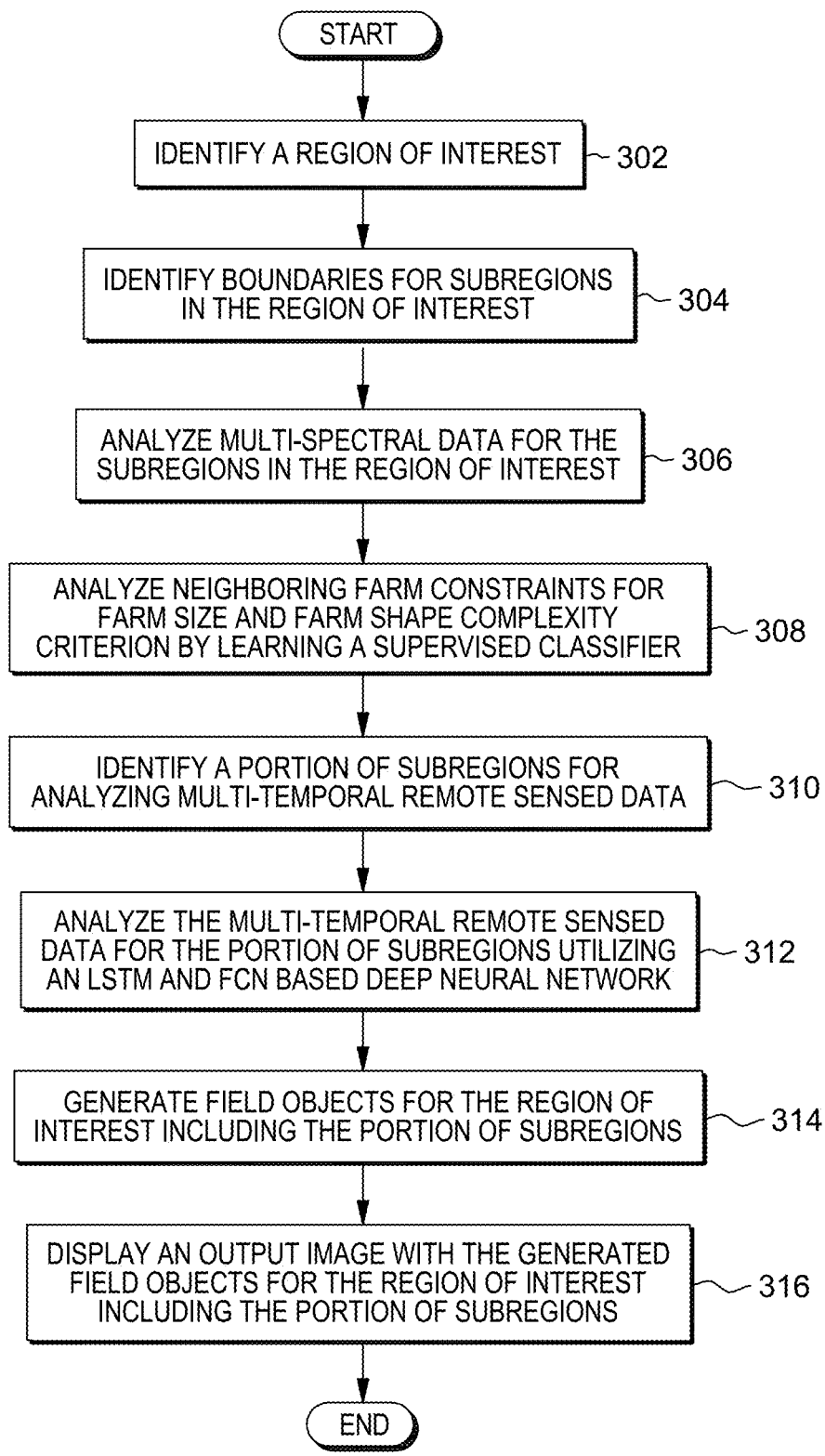
FIG. 3A is a flowchart depicting operational steps of a field boundary detection program for performing selective analysis for field boundary detection, in accordance with an embodiment of the present invention.

FIG. 3 is a flowchart depicting operational steps of a field boundary detection program for performing selective analysis for field boundary detection, in accordance with an embodiment of the present invention.

Field boundary detection program 108 identifies a region of interest (302). In this embodiment, field boundary detection program 108 has the ability to receive geographical coordinates from a user that define the region of interest. The region of interest represents an area where field boundaries are to be established for all the various vegetation contained within the region of interest. In another embodiment, the region of interest can be defined by known geographical coordinates for territories (e.g., town, states, providences) in a given area of a country. Field boundary detection program 108 identifies boundaries for subregions in the region of interest (304). Field boundary detection program 108 utilizes known image-processing methods on multispectral images (e.g., RGB images) to identify boundaries for the subregions in the region of interest at the first level. Field boundary detection program 108 utilizes latitudinal and longitudinal coordinates to establish the boundaries, while sourcing verified government or publicly available source reports and data regarding the agricultural land in the region of interest.

Figure 3B:
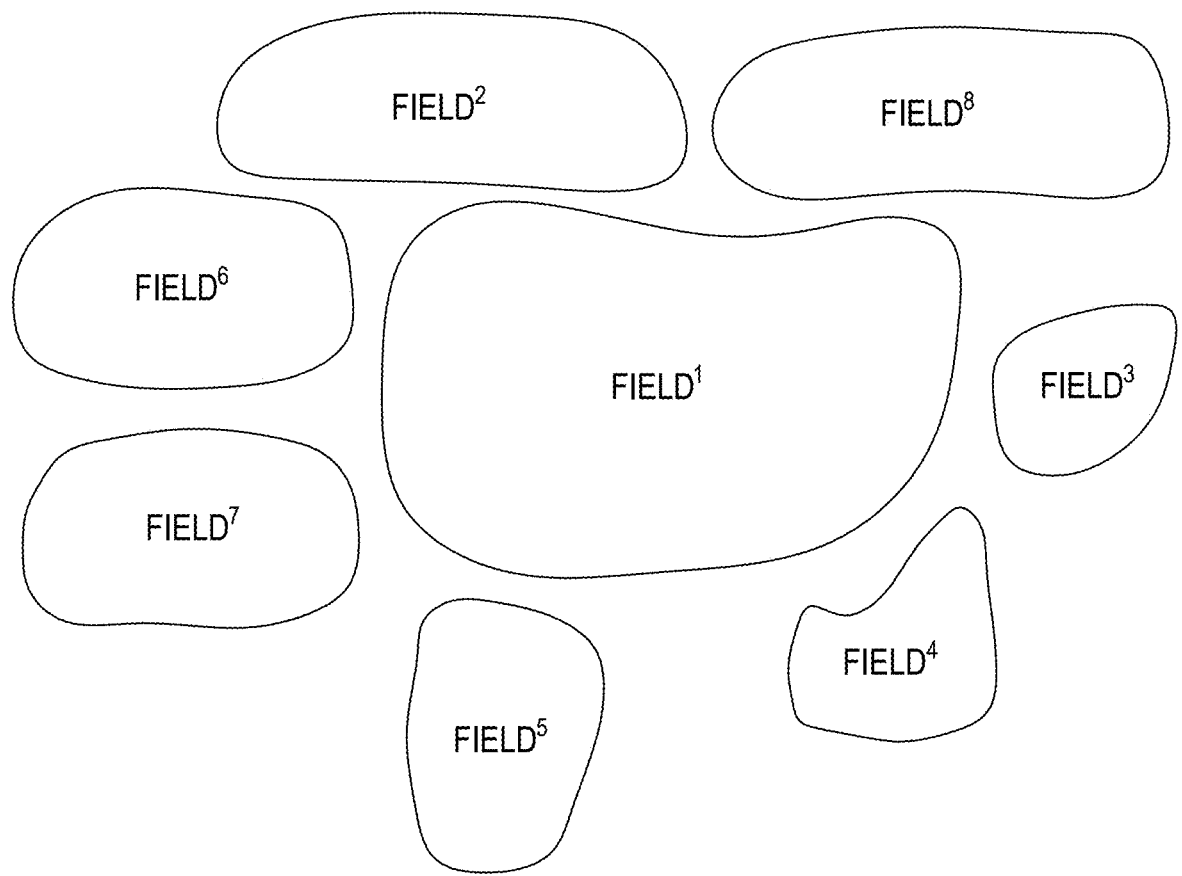
FIG. 3B is an example of a field surrounded by a plurality of neighboring fields for which a field boundary detection program performs selective analysis, in accordance with an embodiment of the present invention.

Field boundary detection program 108 analyzes multispectral data for the subregion in the region of interest (306). Field boundary detection program 108 analyzes a plurality of agriculture fields that are adjacent to an agriculture field of interest to determine whether to mark the agriculture field (i.e., complex) of interest for a second level multitemporal remote sensed data analysis. Field boundary detection program 108 analyzes neighboring farm constraints for farm size and farm shape complexity criterion by learning a supervised classifier (308). A classifier is trained to identify regions for the second level analysis utilizing attributes that include a contour perimeter, a contour area, a convex hull area, a ratio between the convex hull area and the contour area, and the ratio between the contour area and the contour perimeter. FIG. 3B illustrates an example of a farm field (i.e., Field$^1$) surrounded by a plurality of neighboring fields (i.e., Field$^2$, Field$^3$, Field$^4$, Field$^5$, Field$^6$, Field$^7$, and Field$^8$), where field boundary detection program 108 determining whether to mark Field$^1$ as complex for further edge disambiguation. An example of a complex region identification criterion is provided below:

$$f^{complex}(\text{farm}^i) = \omega_{complexity} * f^{shape-constraints}(\text{farm}^i) + \omega_{neighbors} * f^{shape-constraints}(\emptyset^{neighbors}(\text{farm}^i))$$

Field regions are removed based on the following constraints:

$$\ell_1 = \{\pi_{perimeter}^{contour} < \text{th}_{cont\_perimeter}\}$$

$$\ell_2 \{\pi_{area}^{contour} < \text{th}_{contour\_area\_1}\}$$

$$\ell_3 = \{\delta_{conv\_area\_vs\_cont\_area}^{ratio} < \text{th}_{ratio\_area}\} \text{ and } \pi_{area}^{contour} < \text{th}_{contour\_area\_2}\}$$

$$\ell_4 = \{\delta_{c\_area\_vs\_perm}^{ratio} < \text{th}_{ratio\_area\_perm}\} \text{ and } \{\pi_{area}^{contour} < \text{th}_{contour\_area\_3}\}$$

Field regions are removed based on the following constraints:

$$\ell_5 = \{\delta_{conv\_area\_vs\_cont\_area}^{ratio} > \text{th}_{ratio\_area} \text{ and } \pi_{area}^{contour}\} > \text{th}_{contour\_area\_4}\}$$

The definitions provided are:

Perimeter of the contour = $\pi_{perimeter}^{contour}$

Contour area = $\pi_{area}^{contour}$

Convex hull area = $\pi_{area}^{convexhull}$ $$\delta_{conv\_area\_vs\_cont\_area}^{ratio} = \frac{\pi_{area}^{convexhull}}{\pi_{area}^{contour}}$$

$$\delta_{c\_area\_vs\_perm}^{ratio} = \frac{\pi_{area}^{contour}}{\pi_{perimeter}^{contour}}$$

Field boundary detection program 108 identifies a portion of subregions for analyzing multitemporal remote sensed data (310). The portion of subregions in the region of interest represents one or more subregions with first-level agglomerated field that may require separation and first-level fragmented fields that may require merging based on the shapes, contours, and sizes of field resulting from the first-level analysis. Field boundary detection program 108 identifies the first-level agglomerated field and the first-level fragmented fields as requiring a second level multitemporal remote sensed data analysis.

Field boundary detection program 108 analyzes the multitemporal remote sensed data for the portion of subregion utilizing an LSTM and FCN based deep neural network (312). In this embodiment, field boundary detection program 108 combines two different types of remote-sensed data, SAR and NDVI combined with weather data to capture growth stage information for vegetation while performing the temporal analysis over different periods of time. The different periods of time allow for field boundary detection program 108 to utilize historical sowing and harvesting patterns as leverage to identify any missing edges in agglomerated fields in the portion of subregions. Field boundary detection program 108 utilizes snapshots of SAR and NDVI remote-sensed data at different periods of time to produce spatiotemporal outputs based on pixel-wise temporal patterns utilizing pixel-wise 3D LSTM. Field boundary detection program 108 utilizes an attention layer to provide weights to different periods of time to leverage the historical sowing and harvesting patterns. Spatiotemporal outputs combined with multispectral shots utilized in the first-level analysis are fed to a convolutional encoder decoder network (i.e., FCN) to produce a final segmented output for the portion of subregions in the region of interest.

Field boundary detection program 108 generates field objects for the region of interest including the portion of subregions (314). The field objects represent the boundaries for the field in the portion of subregions of the region of interest. Since field boundaries were established at the first-level analysis in 304, field boundary detection program 108 generates field objects resulting from the second level analysis for the portion of subregions in the region of interest.

Field boundary detection program 108 displays an output image with the generated field objects for the region of interest including the portion of subregions (316). Field boundary detection program 108 displays the output image with the field boundaries identified in the first-level analysis and the second level analysis. Field boundary detection program 108 has the ability to highlight the portion of subregions where the second level analysis of the multitemporal remote-sensed data occurred to illustrate an occurrence of agglomerated fields or fragmented fields. Field boundary detection program 108 can provide the user an option to view the generated field objects from the second level analysis (i.e., the multitemporal remote-sensed data analysis) as an overlay over the boundaries identified in the first level analysis. Field boundary detection program 108 can also provide a user an option to accept the generated field objects due to the second level analysis or revert back to the boundaries identified in the first level analysis.

Figure 4A:
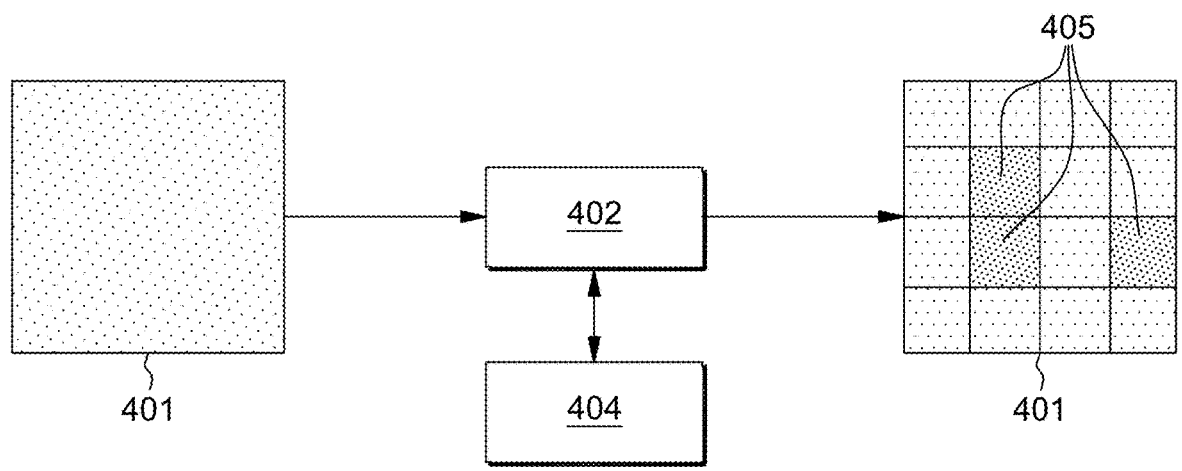
FIG. 4A is a process flow for identifying a portion of subregions for analyzing multitemporal remote sensed data, in accordance with an embodiment of the present invention.

FIG. 4A is a process flow for identifying a portion of subregions for analyzing multitemporal remote sensed data, in accordance with an embodiment of the present invention. In this embodiment, field boundary detection program 108 identifies region of interest 401 and at block 402, field boundary detection program 108 performs efficient field boundary detection by identifying a portion of subregions to perform selective analysis of remote-sensed data over time. Prior to performing the selective analysis of remote-sensed data over time, field boundary detection program 108 has to identify a portion of subregions of the region of interest to which the selective analysis is to be performed. At block 404, field boundary detection program 108 utilizes known image processing methods on multispectral images to identify boundaries for the subregions in the region of interest. Subsequently, field boundary detection program 108 identifies first-level agglomerated fields that may have to be separated and first-level fragmented fields that may have to be merged via the selective analysis of remote-sensed data over time (i.e., second level analysis). Highlighted subregions 405 represent the portion of subregions of region of interest 401 for which a second level analysis of the multi-temporal remote sense data is required.

Figure 4B:
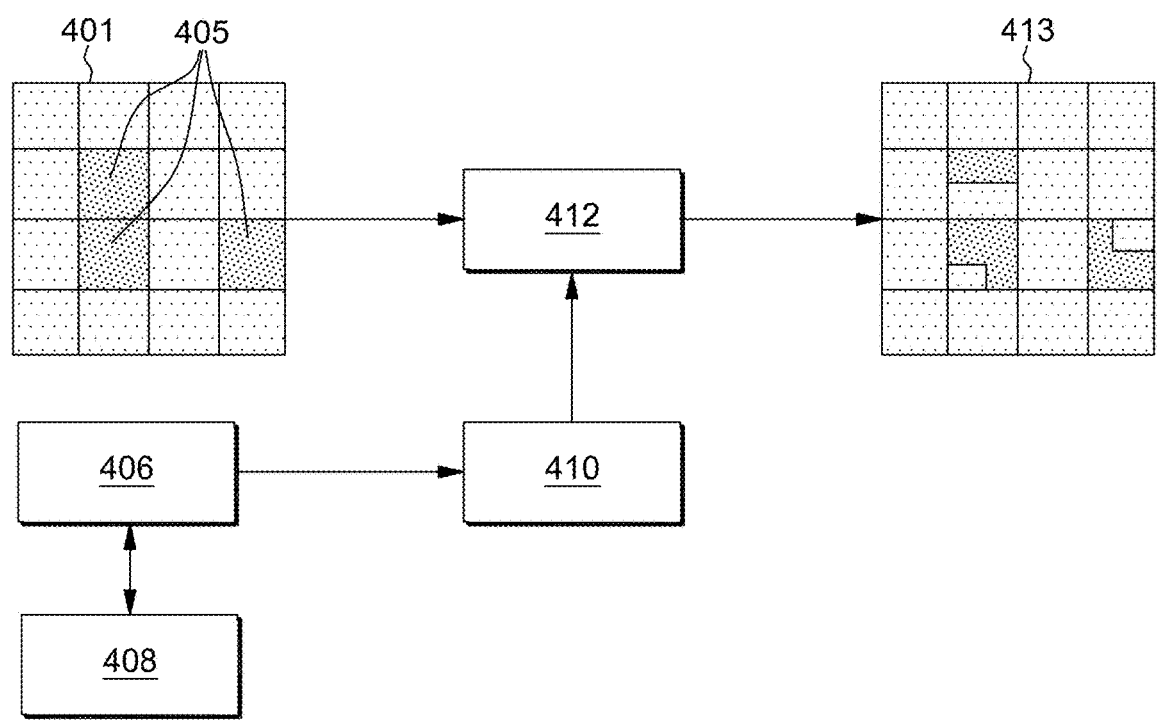
FIG. 4B is a process flow for analyzing the multitemporal remote sensed data for the portion of subregions, in accordance with an embodiment of the present invention.

FIG. 4B is a process flow for analyzing the multitemporal remote sensed data for the portion of subregions, in accordance with an embodiment of the present invention. As discussed above, highlighted subregions 405 of region of interest 401 represent regions requiring a second-level analysis based on identified first-level field sized and field shape complexities. At block 406, field boundary detection program 108 initials the selective analysis of remote-sensed data over times for highlighted subregions 405 and block 408 represents the historical sowing and harvesting patterns to be leveraged when identifying missing edges in agglomerated fields. At block 410, field boundary detection program 108 performs deep learning based multitemporal image analysis on SAR and NVDI images for instance segmentation of field regions. Subsequently at block 412, field boundary detection program 108 finalizes field objects in conjunction with the prior identified boundaries for the subregions in region of interest 401. Output image 413 represents region of interest 401 including the subregions with the now identified missing edges in the agglomerated fields.

Figure 5A:
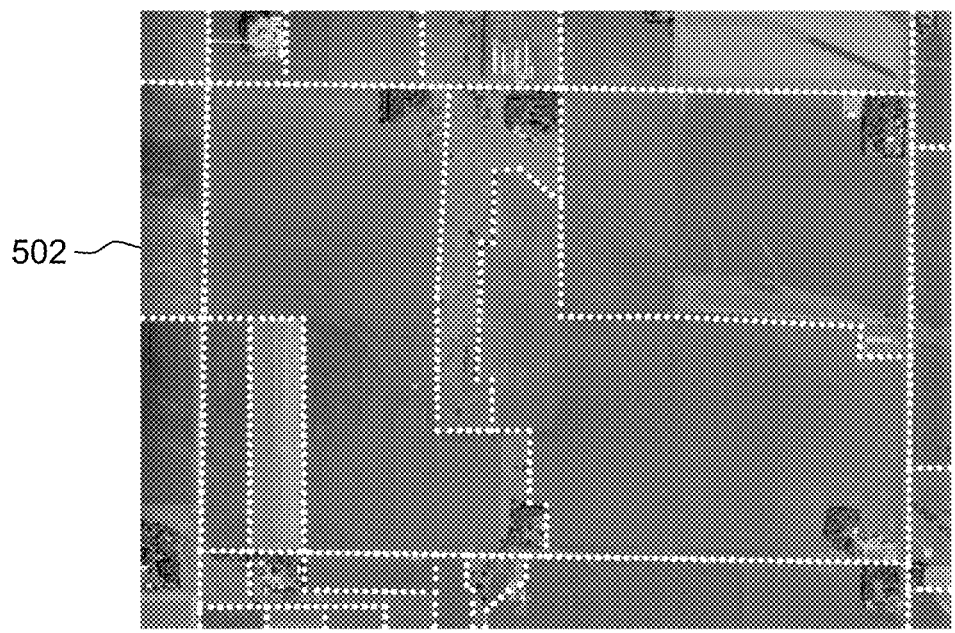
FIG. 5A is an example of an overhead input image of a region of interest, in accordance with an embodiment of the present invention.
Figure 5B:
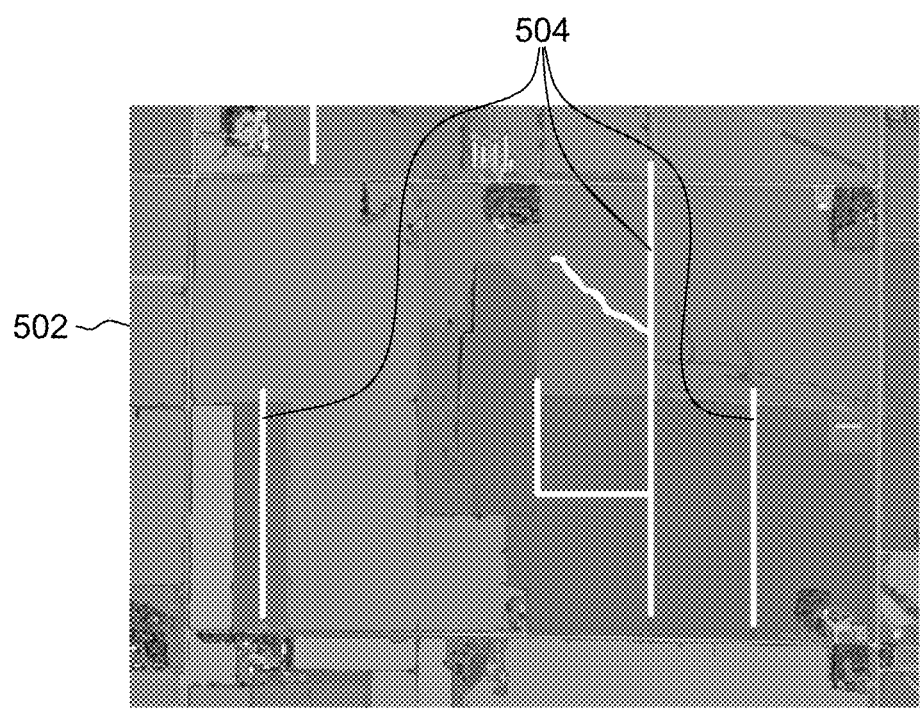
FIG. 5B is an example of the overhead input image from FIG. 4A with detected field boundaries and inferred edges, in accordance with an embodiment of the present invention.

FIG. 5A is an example of an aerial input image of a region of interest with detected edges based on a first level analysis, in accordance with an embodiment of the present invention. In this example, region of interest 502 includes numerous agricultural fields of vegetation which includes agglomerated fields that may have to be fragmented and fragmented fields that may have to be merged. FIG. 5A illustrates identified field boundaries in region of interest 502 as a result of a first level analysis of multispectral images by field boundary detection program 108. FIG. 5B is an example of the overhead input image from FIG. 5A with identified missing edges based on a second level analysis, in accordance with an embodiment of the present invention. Subsequent to field boundary detection program 108 performing a first-level analysis of the multispectral images to identify field boundaries, field boundary detection program 108 performs a second level analysis of the multitemporal remote sensed data to determine if any inferred edges are valid edges. Valid edges 504 in region of interest 502 represent edges (i.e., boundaries) previously omitted during the first-level analysis of the multispectral images. By performing the second level selective analysis of the multitemporal remote sensed data for the portion of subregion in the region of interest, field boundary detection program 108 was able to identify valid edges 504, generate the valid edges (i.e., field objects), and display an output image with the generated valid edges for region of interest 502. Furthermore, in this example field boundary detection program 108 highlights the valid edges 504 to illustrate to the user where the second level selective analysis of the multitemporal remote sensed data was performed. Field boundary detection program 108 has the ability to provide a selective user interface option to accept or reject one or more of the valid edges 504 identified during the second level analysis.

Figure 6A:
FIG. 6A is an example of an overhead input image of a region of interest, in accordance with an embodiment of the present invention.
Figure 6B:
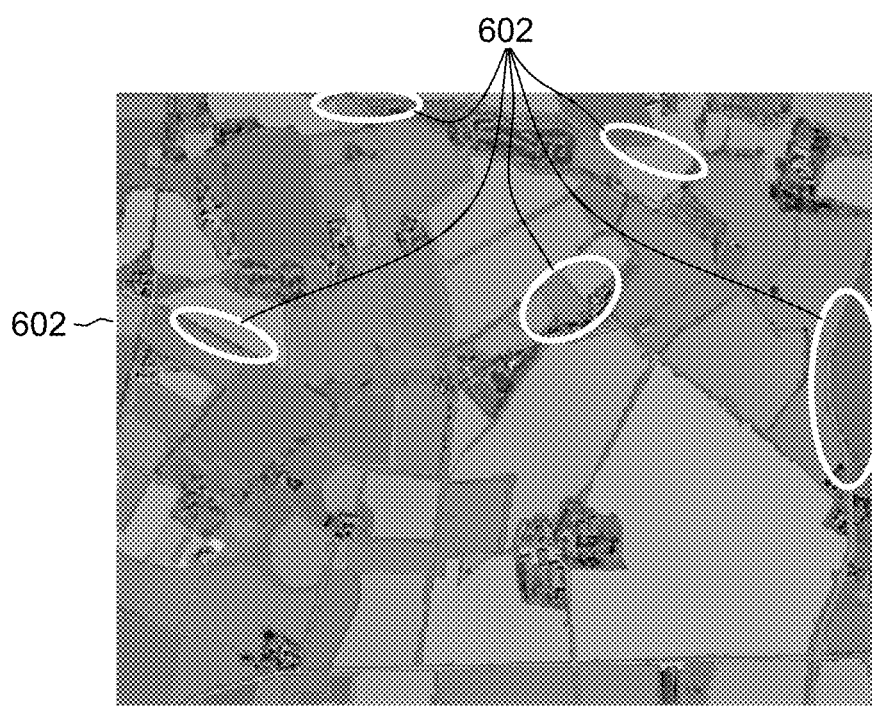
FIG. 6B is an example of the overhead input image from FIG. 5B with detected field boundaries and potential adjacent fields for merging, in accordance with an embodiment of the present invention.

FIG. 6A is an example of an overhead input image of a region of interest, in accordance with an embodiment of the present invention. In this example, region of interest 602 includes numerous agricultural fields of vegetation which includes agglomerated fields that may have to be fragmented and fragmented fields that may have to be merged. FIG. 6B is an example of the overhead input image from FIG. 6A with detected field boundaries and potential adjacent fields for merging, in accordance with an embodiment of the present invention. Subsequent to field boundary detection program 108 performing a first-level analysis of the multispectral images to identify field boundaries, there are multiple instances of where multiple adjacent fields need to be merged and boundaries removed. Areas 604 illustrate instances were a second level analysis of multitemporal remote-sensed data for portion of subregions in region of interest 602 can provide accurate field boundary detection. Analysis of multitemporal remote-sensed data for areas 604 allows for field boundary detection program 108 to unambiguously merge adjacent blocks where needed.

Figure 7:
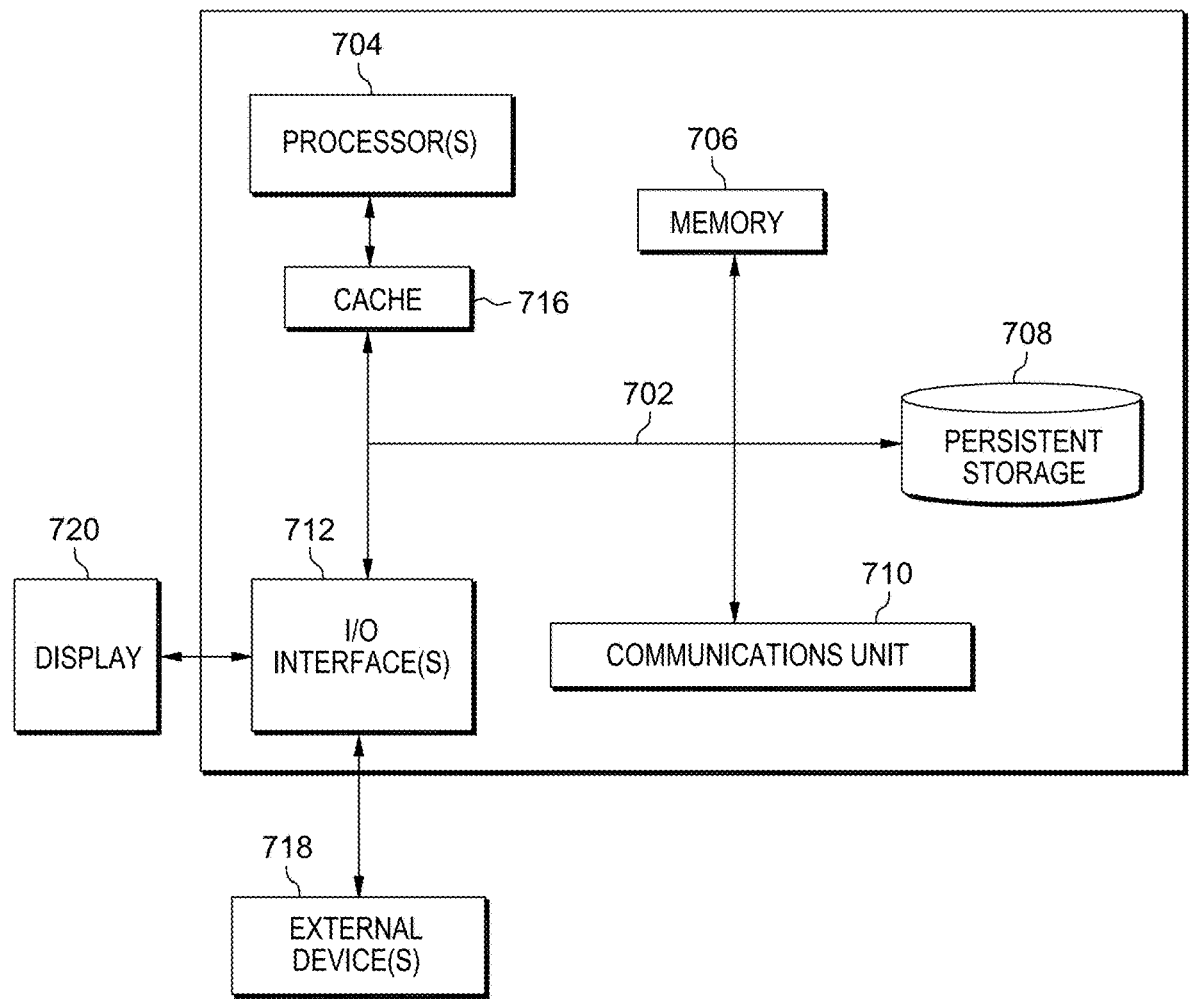
FIG. 7 is a block diagram of components of a computer system, such as the server computer of FIG. 1, in accordance with an embodiment of the present invention.

FIG. 7 depicts a computer system, where server computer 102 is an example of a computer system that can include field boundary detection program 108. The computer system includes processors 704, cache 716, memory 706, persistent storage 708, communications unit 710, input/output (I/O) interface(s) 712 and communications fabric 702. Communications fabric 702 provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of processors 704 by holding recently accessed data, and data near recently accessed data, from memory 706.

Program instructions and data used to practice embodiments of the present invention may be stored in persistent storage 708 and in memory 706 for execution by one or more of the respective processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Program instructions and data used to practice embodiments of the present invention may be downloaded to persistent storage 708 through communications unit 710.

I/O interface(s) 712 allows for input and output of data with other devices that may be connected to each computer system. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention can be stored on such portable computer readable storage media and can be loaded onto persistent storage 708 via I/O interface(s) 712. I/O interface(s) 712 also connect to display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for selective boundary detection, the method comprising:
    identifying, by one or more processors, a plurality of boundaries for a plurality of subregions in a region of interest utilizing one or more multispectral images for the region of interest;
    analyzing, by one or more processors, a plurality of adjacent fields to a first field in a first subregion out of the plurality of subregions utilizing a region identification criterion based on a plurality of attributes for the first field and the plurality of adjacent fields;
    determining, by one or more processors, based on the analyzing, the first region with the first field requires further analysis of multitemporal remote sensed data over a defined period of time;
    analyzing, by one or more processors, the multitemporal remote sensed data over the defined period of time for the first region utilizing a long short-term memory (LSTM) and fully convolutional network (FCN); and
    generating, by one or more processors, a plurality of field objects for the first region.

2. The method of claim 1, further comprising:
    displaying, by one or more processors, an output image with the plurality of field objects for the first region, wherein the output image includes an addition of a boundary in the first field relative to the plurality of adjacent fields.

3. The method of claim 1, further comprising:
    displaying, by one or more processors, an output image with the plurality of field objects for the first region, wherein the output image includes a removal of a boundary in the first field relative to the plurality of adjacent fields.

4. The method of claim 1, wherein the plurality of attributes are selected from a group consisting of: a contour perimeter, a contour area, a convex hull area, a ratio between the convex hull area and the contour area, and a ratio between the contour area and the contour perimeter.

5. The method of claim 1, wherein the multitemporal remote sensed data includes synthetic-aperture radar (SAR) images and normalized difference vegetation index (NDVI) images in combination with weather data.

6. The method of claim 2, further comprising:
    providing, by one or more processors, at an attention layer, a plurality of weights to the multitemporal remote sensed data based on weather data.

7. The method of claim 2, wherein an overlay on the output image highlights the addition of the boundary in the first field relative to the plurality of adjacent fields.

8. The method of claim 3, wherein an overlay on the output image highlights the removal of the boundary in the first field relative to the plurality of adjacent fields.

9. A computer program product for selective boundary detection, the computer program product comprising:
    one or more computer readable storage media and program instructions stored on at least one of the one or more storage media, the program instructions comprising:
    program instructions to, identify a plurality of boundaries for a plurality of subregions in a region of interest utilizing one or more multispectral images for the region of interest;
    program instructions to, analyze a plurality of adjacent fields to a first field in a first subregion out of the plurality of subregions utilizing a region identification criterion based on a plurality of attributes for the first field and the plurality of adjacent fields;

program instructions to determine, based on the analyzing, the first region with the first field requires further analysis of multitemporal remote sensed data over a defined period of time program instructions to analyze the multitemporal remote sensed data over the defined period of time for the first region utilizing a long short-term memory (LSTM) and fully convolutional network (FCN); and program instructions to generate a plurality of field objects for the first region.

10. The computer program product of claim 9, further comprising program instructions, stored on the one or more computer readable storage media, which when executed by a processor, cause the processor to:

display an output image with the plurality of field objects for the first region, wherein the output image includes an addition of a boundary in the first field relative to the plurality of adjacent fields.

11. The computer program product of claim 9, further comprising program instructions, stored on the one or more computer readable storage media, which when executed by a processor, cause the processor to:

display an output image with the plurality of field objects for the first region, wherein the output image includes a removal of a boundary in the first field relative to the plurality of adjacent fields.

12. The computer program product of claim 9, wherein the plurality of attributes are selected from a group consisting of: a contour perimeter, a contour area, a convex hull area, a ratio between the convex hull area and the contour area, and a ratio between the contour area and the contour perimeter.

13. The computer program product of claim 9, wherein the multitemporal remote sensed data includes synthetic-aperture radar (SAR) images and normalized difference vegetation index (NDVI) images in combination with weather data.

14. The computer program product of claim 10, program instructions, stored on the one or more computer readable storage media, which when executed by a processor, cause the processor to:

provide, at an attention layer, a plurality of weights to the multitemporal remote sensed data based on the weather data.

15. The computer program product of claim 10, wherein an overlay on the output image highlights the addition of the boundary in the first field relative to the plurality of adjacent fields.

16. The computer program product of claim 11, wherein an overlay on the output image highlights the removal of the boundary in the first field relative to the plurality of adjacent fields.

17. A computer system for selective boundary detection, the computer system comprising:

one or more computer processors;

one or more computer readable storage media; and program instructions stored on the computer readable storage media for execution by at least one of the one or more computer processors, the program instructions comprising:

program instructions to, identify a plurality of boundaries for a plurality of subregions in a region of interest utilizing one or more multispectral images for the region of interest;

program instructions to, analyze a plurality of adjacent fields to a first field in a first subregion out of the plurality of subregions utilizing a region identification criterion based on a plurality of attributes for the first field and the plurality of adjacent fields;

program instructions to determine, based on the analyzing, the first region with the first field requires further analysis of multitemporal remote sensed data over a defined period of time program instructions to analyze the multitemporal remote sensed data over the defined period of time for the first region utilizing a long short-term memory (LSTM) and fully convolutional network (FCN); and program instructions to generate a plurality of field objects for the first region.

18. The computer system of claim 17, further comprising program instructions, stored on the one or more computer readable storage media, which when executed by a processor, cause the processor to:

display an output image with the plurality of field objects for the first region, wherein the output image includes an addition of a boundary in the first field relative to the plurality of adjacent fields.

19. The computer system of claim 17, further comprising program instructions, stored on the one or more computer readable storage media, which when executed by a processor, cause the processor to:

display an output image with the plurality of field objects for the first region, wherein the output image includes a removal of a boundary in the first field relative to the plurality of adjacent fields.

20. The computer system of claim 17, wherein the plurality of attributes are selected from a group consisting of: a contour perimeter, a contour area, a convex hull area, a ratio between the convex hull area and the contour area, and a ratio between the contour area and the contour perimeter.

* * * * *